United States Patent
Aloumanis et al.

(10) Patent No.: US 9,445,639 B1
(45) Date of Patent: Sep. 20, 2016

(54) EMBEDDING INTELLIGENT ELECTRONICS WITHIN A MOTORCYLE HELMET

(71) Applicants: Peter Aloumanis, Boca Raton, FL (US); Elias W. Aloumanis, Boca Raton, FL (US)

(72) Inventors: Peter Aloumanis, Boca Raton, FL (US); Elias W. Aloumanis, Boca Raton, FL (US)

(*) Notice: Subject to any disclaimer, the term of this patent is extended or adjusted under 35 U.S.C. 154(b) by 218 days.

(21) Appl. No.: 13/671,646

(22) Filed: Nov. 8, 2012

(51) Int. Cl.
*G08G 5/00* (2006.01)
*A42B 3/04* (2006.01)
*G09G 5/00* (2006.01)
*G02B 27/01* (2006.01)

(52) U.S. Cl.
CPC ........... *A42B 3/0453* (2013.01); *A42B 3/0426* (2013.01); *G02B 27/017* (2013.01); *G09G 5/00* (2013.01)

(58) Field of Classification Search
CPC ........... G02B 27/017; G02B 27/0176; G02B 2027/0187
USPC ........ 345/7, 8; 359/630, 618, 709, 717, 646; 349/11
See application file for complete search history.

(56) References Cited

U.S. PATENT DOCUMENTS

| | | | |
|---|---|---|---|
| 2006/0277666 A1* | 12/2006 | Gertsch et al. | 2/424 |
| 2007/0203625 A1* | 8/2007 | Quigley et al. | 701/33 |
| 2009/0109292 A1* | 4/2009 | Ennis | 348/158 |
| 2010/0137006 A1* | 6/2010 | Rofougaran | 455/457 |
| 2013/0031699 A1* | 2/2013 | Gafforio et al. | 2/411 |
| 2013/0289459 A1* | 10/2013 | Bernardoni | 602/17 |
| 2013/0305437 A1* | 11/2013 | Weller et al. | 2/422 |

* cited by examiner

*Primary Examiner* — Jennifer Nguyen
(74) *Attorney, Agent, or Firm* — Patents on Demand P.A.; Brian K. Buchheit; Scott M. Garrett

(57) ABSTRACT

A motorcycle helmet can include one or more internally mounted sensors within the motorcycle helmet. The sensors can be positioned within an embedded electronics layer which can include electronic components. The components can include logic processing components. The layer can be sandwiched between an outer shell of the helmet and an inner shell of the helmet. A software program executing within the logic processing components can receive input from the sensors in real-time. The software can automatically execute a programmatic action in response to receiving the input.

17 Claims, 6 Drawing Sheets

EMBEDDING INTELLIGENT ELECTRONICS WITHIN A MOTORCYLE HELMET

BACKGROUND

The present invention relates to the field of motorcycle helmets and, more particularly, to embedding intelligent electronics within a motorcycle helmet.

Currently, there are many motorcycle helmet cameras which can be attached to a helmet to provide a first person perspective from the camera point of view. For example, helmet cameras are often used to record footage of a journey or feat (e.g., motorcycle race). These devices, however, are mounted externally on the helmet. As such, these devices can result in aesthetic problems as well as safety issues for a motorcycle rider wearing the helmet. For example, the design of these devices can be aesthetically displeasing or can be colored inappropriate colors. Externally mounted cameras cause physical imbalances which can affect helmet positioning and/or protection. For example, the camera can add weight to the helmet which can create additional tension on the chin strap of the helmet, making wearing the motorcycle helmet uncomfortable.

Further, during an accident involving the helmet, the camera can break loose from the mount and cause harm to the wearer. For example, when a motorcycle rider falls, a dislodged camera can become a projectile which can injure the wearer or a nearby pedestrian. In instances where the camera can be damaged, vital footage from the camera can be lost. That is, current helmet cameras lack helmet integration, durability, and safety features.

BRIEF SUMMARY

One aspect of the present invention can include a method, a system, a computer program product, and an apparatus for embedding intelligent electronics within a motorcycle helmet. A motorcycle helmet can include one or more internally mounted sensors within the motorcycle helmet. The sensors can be positioned within an embedded electronics layer which can include electronic components. The components can include logic processing components. The layer can be sandwiched between an outer shell of the helmet and an inner shell of the helmet. A software program executing within the logic processing components can receive input from the sensors in real-time. The software can automatically execute a programmatic action in response to receiving the input.

Another aspect of the present invention can include a system, a computer program product, an apparatus, and a method for embedding intelligent electronics within a motorcycle helmet. An internally mounted sensor within a motorcycle helmet can be identified. The sensor can be positioned within an embedded electronics layer. The layer can include electronic components. The layer can be sandwiched between an outer shell of the helmet and an inner shell of the helmet. A data stream from the sensor can be received in real-time. The data stream can be processed into a human readable data format. The data format can be presented within a display communicatively linked to the helmet.

Yet another aspect of the present invention can include a system, an apparatus, a method, and a computer program product for embedding intelligent electronics within a motorcycle helmet. The helmet can include a computer program product which can manage a one or more internally mounted sensors within the motorcycle helmet. The sensors can be positioned within an embedded electronics layer of the helmet. The layer can include electronic components. The layer can be sandwiched between an outer shell of the helmet and an inner shell of the helmet.

DETAILED DESCRIPTION

Figure 1A:
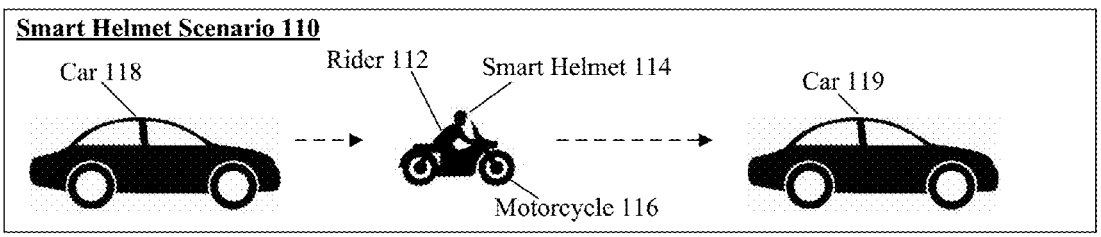
FIG. 1A is a schematic diagram illustrating a scenario and a set of embodiment for embedding intelligent electronics within a motorcycle helmet in accordance with an embodiment of the inventive arrangements disclosed herein.
Figure 1A:
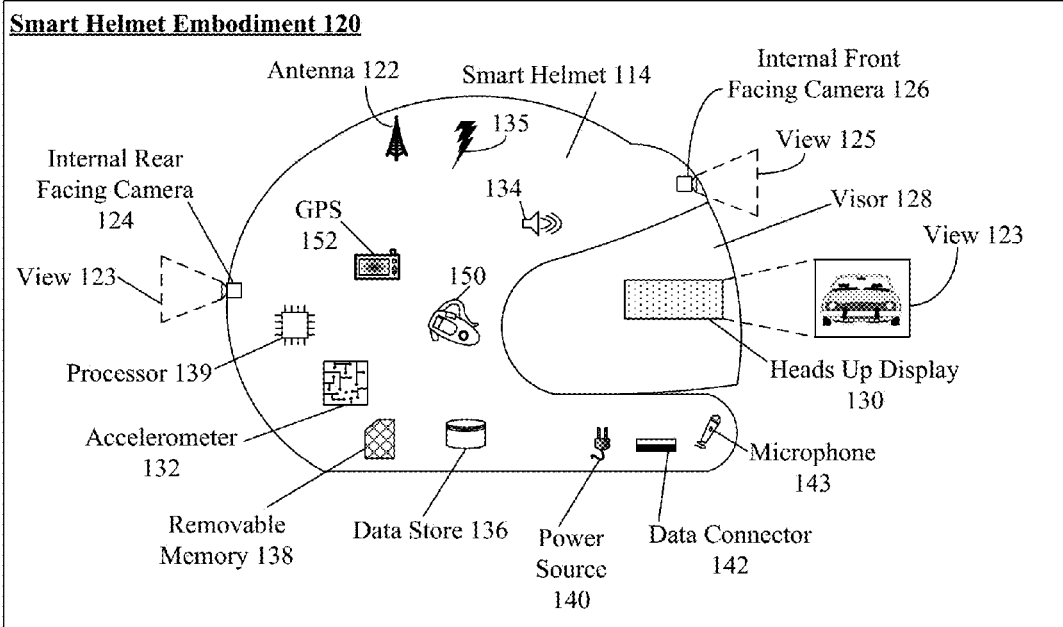
Figure 1A:
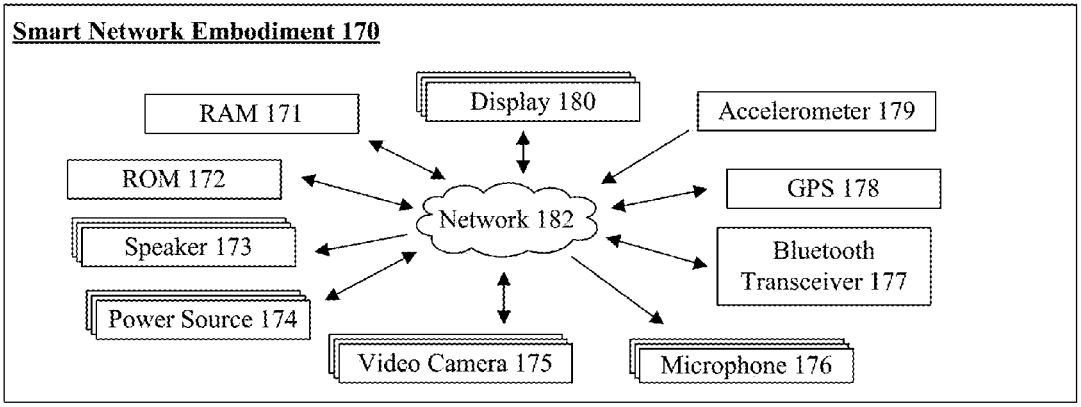

The present disclosure is a solution for embedding intelligent electronics within a motorcycle helmet. In the solution, one or more sensors can be embedded within an intermediate layer of a motorcycle helmet to enable a smart helmet to be realized. In one embodiment, the helmet can include, but is not limited to, a front facing camera, a rear facing camera, an accelerometer, a volatile memory, a non-volatile memory, a power source, a data connector, a heads up display (HUD), a Global Positioning System (GPS), a processor, a network transceiver, a Bluetooth transceiver, and the like. In the embodiment, the electronic components cooperate to perform a variety of tasks including, but not limited to, displaying vehicle instrumentation information, automatically performing emergency procedures (e.g., calling an EMS), presenting pre-collision warning, recording sensor information, and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a schematic diagram illustrating a scenario 110 and a set of embodiment 120, 170 in accordance with an embodiment of the inventive arrangements disclosed herein. Scenario 110 and/or embodiment 120, 170 can be performed in the context of method 200, and/or system 300. In scenario 110, a motorcycle rider 112 can operate the motorcycle 116 on a roadway which can be occupied by car 118 and/or car 119. For example, rider 112 can ride motorcycle 116 in front of car 118 and behind car 119. Embodiment 120, 170 can represent exemplary configurations of smart helmet 114 worn by rider 112. Embodiment 120 can illustrate a smart helmet component arrangement for helmet 114. Embodiment 170 can illustrate a smart network associated with smart helmet 114.

In embodiment 120, smart helmet 114 can include, but is not limited to, an internal front facing camera 126, an internal rear facing camera 124, an accelerometer 132, a volatile memory (e.g., data store 136), a non-volatile memory (e.g., removable memory 138), a power source 140, a data connector 142, a heads up display (HUD) 130, a Global Positioning System 152, an antenna 122, a processor 139, a network transceiver 135, a Bluetooth transceiver 150, loudspeaker 134, a microphone 143, and the like. It should be appreciated that embodiment 120 can include, one or more sensors not shown within embodiment 120. For example, embodiment 120 can include a thermometer (e.g., thermostat), vibrational sensor, and the like.

In one configuration of the embodiment 120, helmet 114 can include a front facing camera 126 and a rear facing camera 124. Camera 124, 126 can be utilized to present relevant media streams within the heads up display 130 of the visor 128. For example, rear facing camera 124 can be utilized to present view 123 of car 118, enabling rider 112 to be aware of potential danger posed by car 118. In one embodiment, one or more cameras and/or sensors can be embedded within the helmet to reduce the blind spot of rider 112. For example, as car 118 passes rider 112, a camera facing the blind spot can present a video feed of the car 118 within HUD 130 as it passes by.

In one instance, data store 136 and/or memory 138 can be utilized to persist sensor information (e.g., video from camera 124, 126). In the instance, helmet 114 can function as a black box device permitting important pre-collision, collision, and/or post collision information to be obtained. For example, a rider 112 can utilize information within removable memory 138 to determine the cause of a collision (e.g., slippery road, too much lean, etc).

In one instance, helmet 112 can be employed within a racing environment such as a race track to assist a rider 112 in real-time or near real time. For example, as a rider 112 laps a race track, previous sensor information (e.g., speed) can be provided prior to critical features of the race track (e.g., before a hairpin turn).

Antenna 122 can be an electrical device which can converts electric power into radio waves and radio waves into electric power. Antenna 122 can be a radio transmitter which can be utilized for wireless communication. For example 122 can be an 802.11b/g/n (WiFi) antenna.

Camera 124, 126 can be device that records images (e.g., JPEG, GIF) that can be stored directly, transmitted to another location, or both. Camera 124, 126 can include, but is not limited to, an image camera, a video camera, a night vision camera, and the like. Camera 124, 126 can capture images from view 123, 125 which can be persisted within data store 136, memory 138, and/or a remote data store (e.g., USB hard drive). View 123, 125 can be presented in real-time or near real-time within heads up display 130. It should be appreciated that helmet 114 is not limited to two cameras and can include an arbitrary number of cameras. Camera 124, 126 can be similar and/or dissimilar in functionality, capabilities, and the like. In one instance, camera 124, 126 resolution can range from eight megapixels to thirteen megapixels. In one embodiment, camera 124, 126 can be a high definition (HD) camera.

Heads up display 130 can be a transparent display which can presents data without requiring rider 112 to look away from a selected viewpoint. Display 130 can be presented within visor 128 (e.g., embedded display), presented within a display proximate to helmet 114, and the like. Display 130 technology can include liquid crystal display (LCD), liquid crystal on silicon (LCoS), digital micro-mirrors (DMD), organic light-emitting diode (OLED), optical waveguide, scanning laser, and the like. Display 130 can present relevant information in real-time or near real-time.

Accelerometer 132 can be a device that can measure proper acceleration. Accelerometer 132 can include a one axis accelerometer, a two-axis accelerometer, a three-axis accelerometer, and the like. For example, accelerometer 132 can be a tilt sensor. In one instance, accelerometer 132 can be utilized to receive motion input from rider 112. It should be appreciated that the accelerometer 132 can be utilized to detect falls, impacts, and the like.

Loudspeaker 134 can be an electroacoustic transducer that can produce sound in response to an electrical audio signal input. Loudspeaker 134 can include a full range driver, a subwoofer, a woofer, a mid-range driver, a tweeter, a coaxial driver, piezoelectric speaker, and the like. Loudspeaker 134 arrangement can include, but is not limited to, monophonic, stereophonic, quadraphonic, surround, and the like.

Data store 136 and removable memory 138 can be a recording media for retaining digital data. Store 136, memory 138 can include, but is not limited to, non-volatile memory, volatile memory, and the like. Store 136, memory 138 can include, but is not limited to, Dynamic Random Access Memory (DRAM), Static RAM (SRAM), Ferroelectric RAM (F-RAM), Flash memory, Programmable Read Only Memory (PROM), Electronic PROM (EPROM), Erasable EPROM (EEPROM), and the like.

Processor 139 can be a central processing unit able to carry out instructions of a computer program by performing the basic arithmetical, logical, and input/output operations. Processor 139 can include, but is not limited to, an arithmetic logic unit (ALU), a graphical processing unit (GPU), and the like. In one instance, processor 139 can include multi-core processors. The processor 139 can be utilized for traditional and/or proprietary capabilities including, but not limited to, audio/video processing, sensor management, and the like.

Power source 140 can include an external power source, an internal power source, a removable power source, and the like. Power source 140 can include, but is not limited to a battery, an alternating current (AC) power supply, a direct current (DC) power supply, and the like. Power source 140 can be utilized to power components 122-152, proximate devices, and the like. Power source 140 can conform to a Universal Serial Bus, a proprietary interface, and the like.

Microphone 143 can be an acoustic-to-electric transducer or sensor that can convert sound into an electrical signal. Microphone 143 can include, but is not limited to, a dynamic microphone, piezoelectric microphone, fiber optic microphone, and the like. Microphone 143 can include a single, multiple microphones, and the like. Microphone 143 can be omni-directional, unidirectional, cardioid, and the like.

Data connector 142 can be an electronic component for physically mating an electronic input with an electronic output. In one instance, data connector 142 can include one or more traditional and/or proprietary data connectors. Connector 142 can include, but is not limited to Universal Serial Bus (USB), FIREWIRE, External Serial AT Attachment (eSATA), and the like. In one embodiment, connector 142 can permit data stored within memory 138 and/or data store 136 to be downloaded.

Bluetooth transceiver 150 can be a transceiver able to permit near field communication. Transceiver 150 can permit short-wavelength radio transmissions in the ISM band 2400-2480 MHz. Transceiver 150 can be communicatively linked to a Bluetooth device (e.g., mobile phone), permitting traditional and/or proprietary actions to be enabled. In one instance, Bluetooth transceiver 150 can be utilized to communicate with proximate devices (e.g., mobile phone) to perform voice operations including, but not limited to, call emergency services, text messaging a pre-defined contact, and the like. In one embodiment, transceiver 150 can permit communication with an on-board diagnostic system permitting helmet 114 information to be communicated to a proximate device, a HUD 130, and the like.

Global Positioning System (GPS) 152 can be any navigation system that can provide location and time. System 152 can include traditional and/or proprietary functionality. In one instance, GPS 152 can present GPS data within HUD 130. GPS 152 can utilize microphone 143, loudspeaker 134, and the like, to permit turn by turn directions, navigation customization, and the like.

Smart network embodiment 170 illustrates a communications network 182 within smart helmet 114. Network 182 can permit communication between components 171-180. Network 182 can conform to one or more traditional and/or proprietary network topologies, protocols, and the like. For example, network 182 can be a personal area network (PAN) enabling communication with vehicle on-board devices, proximate devices, and the like. In one instance, network 182 can be utilized to link multiple riders together via a mesh network (e.g., mobile ad hoc network). It should be appreciated that network 182 can permit one or more traditional and/or proprietary communication mechanisms, including, but not limited to, electronic mail, text exchange, Voice over Internet Protocol, and the like.

It should be appreciated that helmet 114 can include basic computing components including, but not limited to, one or more processors, one or more buses, a user interface, and the like. It should be understood that helmet 114 can be constructed from commercial off-the-shelf (COTS) electronics permitting helmet 114 cost to be competitive. It should be appreciated that components 122, 152 can include optional components such as a vibration motor, a Light Emitting Diode (LED) indicator, and the like. It should be understood that helmet 114 can include full face helmets, motorcross helmets, modular helmets, open face helmet, and the like.

Figure 1B:
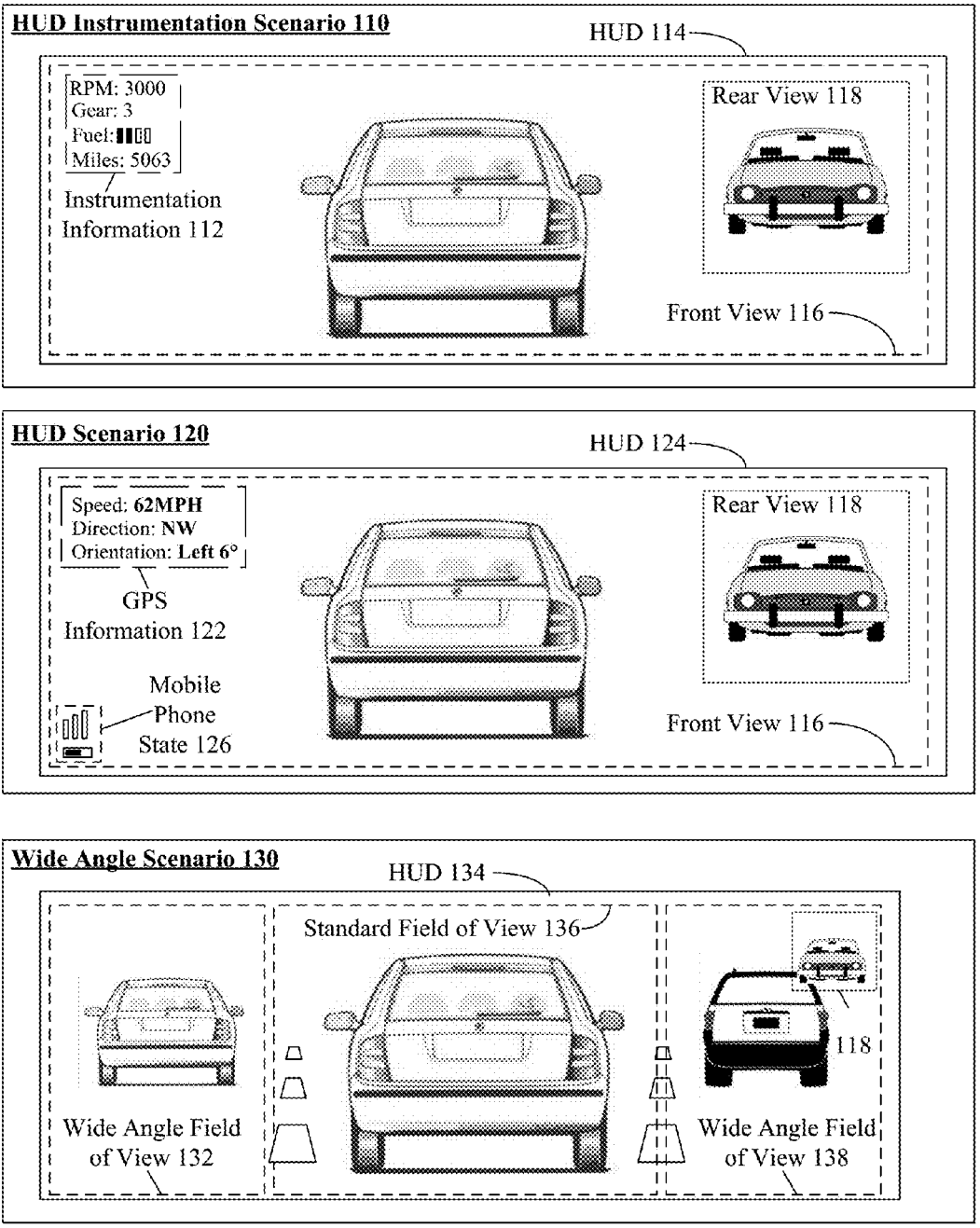
FIG. 1B is a schematic diagram illustrating a set of scenarios for utilizing embedded intelligent electronics within a motorcycle helmet in accordance with an embodiment of the inventive arrangements disclosed herein.

FIG. 1B is a schematic diagram illustrating a set of scenarios 110-130 for utilizing embedded intelligent electronics within a motorcycle helmet in accordance with an embodiment of the inventive arrangements disclosed herein. Scenario 110-130 can be performed in the context of method 200 and/or system 300. Scenario 110-130 can be contextually similar to FIG. 1A scenario 110. That is, in scenario 110-130, a rider can be travelling on a roadway between two cars.

In scenario 110-130, HUD 114, 124, 134 can include a front view 116 and a rear view 118. Front view 116 can include a view through a visor (e.g., real world environment, real world objects) and/or a graphical user interface (e.g., information 112, information 122). In one instance, view 116 can include a rear view 118 which can include audio/video from a rear mounted sensor (e.g., camera).

In scenario 110, a heads up display (HUD) 114 can present instrumentation information 112 of a motorcycle. HUD 114 can include instrumentation information 112, front view 116 (e.g., front facing camera), rear view 118, and the like. Information 112 can include, but is not limited to, engine information (e.g., revolutions per minute), a fuel gauge, odometer, speedometer, oil temperature, and the like.

In scenario 120, a HUD 124 can present device information from proximate (e.g., communicatively linked) devices. Information can include global positioning information 122, mobile phone state 126, and the like. GPS information 122 can include, but is not limited to, maps, navigation information, and the like. Phone state 126 can include, but is not limited to, battery information, signal information, caller ID, multimedia information (e.g., now playing), and the like.

In scenario 130, two or more cameras within a helmet can be utilized to provide a wide angle view 132, 138 within HUD 134. Two or more front facing cameras can be employed to capture images/video from a front point of view (e.g., direction of travel). For example, two cameras can be leveraged to capture a 180 degree field of view. The images/video can be presented seamlessly within HUD 134. For example, wide angle field of view 132, 138 can provide visual assistance to a rider by enabling the rider to see cars to the left and/or right of their position. That is, the field of view 132, 138 can compensate for the limited field of view resulting from helmet design.

Figure 1C:
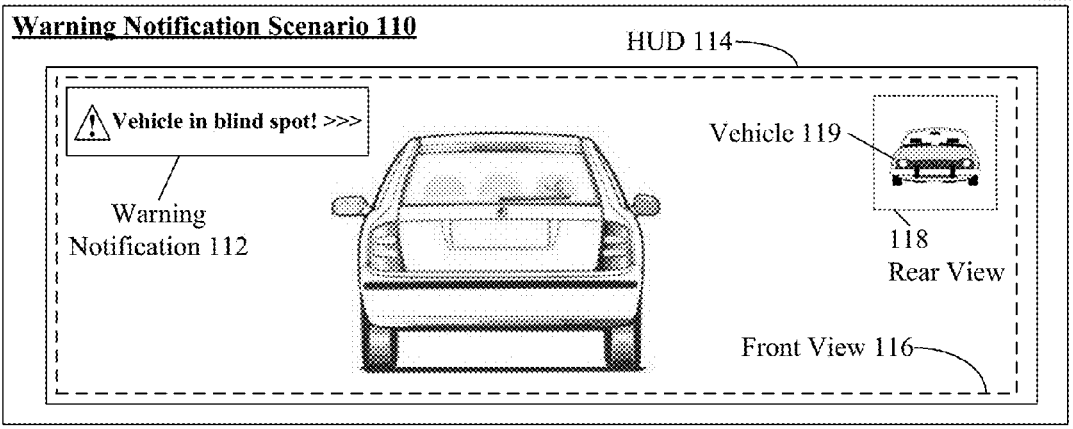
FIG. 1C is a schematic diagram illustrating a set of scenarios for utilizing embedded intelligent electronics within a motorcycle helmet in accordance with an embodiment of the inventive arrangements disclosed herein.
Figure 1C:
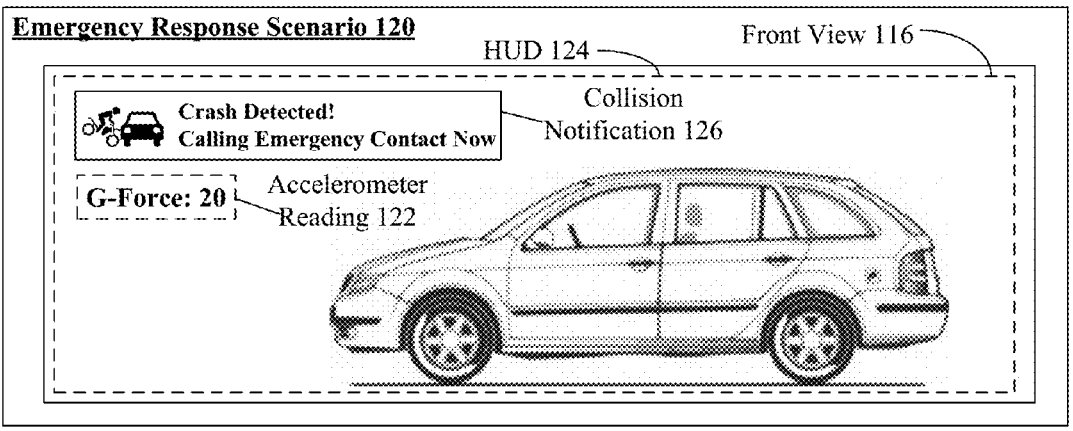
Figure 1C:
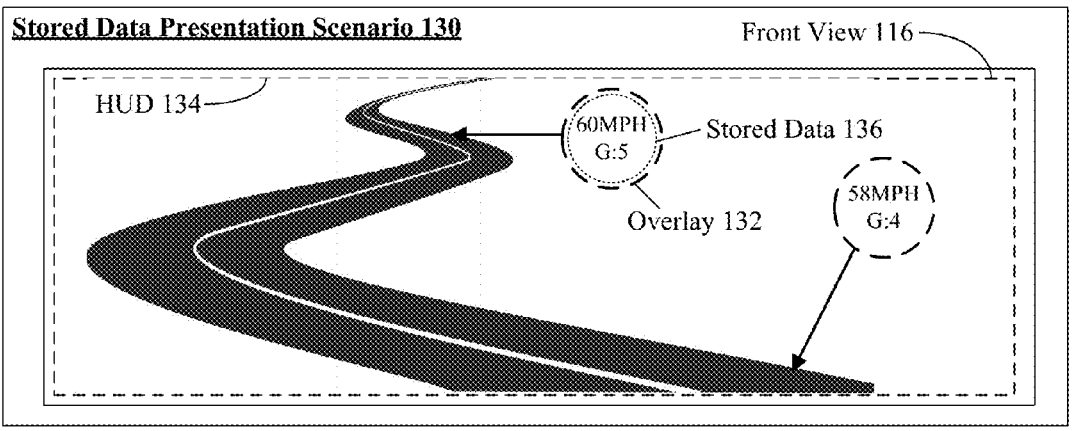

FIG. 1C is a schematic diagram illustrating a set of scenarios 110-130 for utilizing embedded intelligent electronics within a motorcycle helmet in accordance with an embodiment of the inventive arrangements disclosed herein. Scenario 110-130 can be performed in the context of method 200 and/or system 300. Scenario 110-130 can be contextually similar to FIG. 1A scenario 110. That is, in scenario 110-130, a rider can be travelling on a roadway between two cars.

In scenario 110-130, heads up display (HUD) 114, 124, 134 can include a front view 116 and/or a rear view 118. Front view 116 can include a view through a visor (e.g., real world environment, real world objects) and/or a graphical user interface (e.g., notification 112, reading 122). In one instance, view 116 can include a rear view 118 which can include audio/video from a rear mounted sensor (e.g., camera).

In scenario 110, HUD 114 can present a warning notification 112 within front view 116. Notification 112 can be associated with an object detection system, motion detection system, and the like. For example, notification 112 can be presented when an object is detected outside the viewpoint of a rider wearing the helmet. In one instance, when a vehicle 119 is within a blind spot of a rider wearing the helmet, notification 112 can be presented. It should be appreciated that notification 112 can include directional audio/video. For example, when a vehicle is approaching from the right, notification 112 can present an appropriate visual (e.g., ">>>" arrows) and audio cue (e.g., right stereo speaker alert). In one instance, rear view 118 can present audio/video of a vehicle associated with notification 112. Notification 112 can include vehicle information, customized information, and the like. Notification 112 can include traditional and/or proprietary alert mechanisms. For example, a chime can be used to indicate a vehicle is approaching rapidly from the rear. Notification 112 can include user customizable notifications.

In scenario 120, a collision notification 126 can be presented within a HUD 124 when a collision is detected by the helmet. The notification 126 can associated with an emergency action, collision information, and the like. For example, the emergency action can include automatically calling an emergency contact in response to the collision. It should be appreciated that pre-event/post-event sensor information (e.g., reading 122) can be optionally presented, persisted, and the like.

In scenario 130, a HUD 134 can be utilized to present stored data 136 within an overlay 132. In one instance, stored data 136 can include automatically collected sensor information, user provided data, and the like. In the embodiment, stored data 136 can be presented within a navigation map. For example, speed and gear information can be presented for a race track map within HUD 134. It should be appreciated that the data 136 can be presented in real-time or near real-time.

Drawings presented herein are for illustrative purposes only and should not be construed to limit the invention in any regard. Scenario 110-130 can be associated with an Advanced Automatic Collision Notification (AACN) system, a pre-collision system, a Vehicular Emergency Data Set, and the like.

Figure 1D:
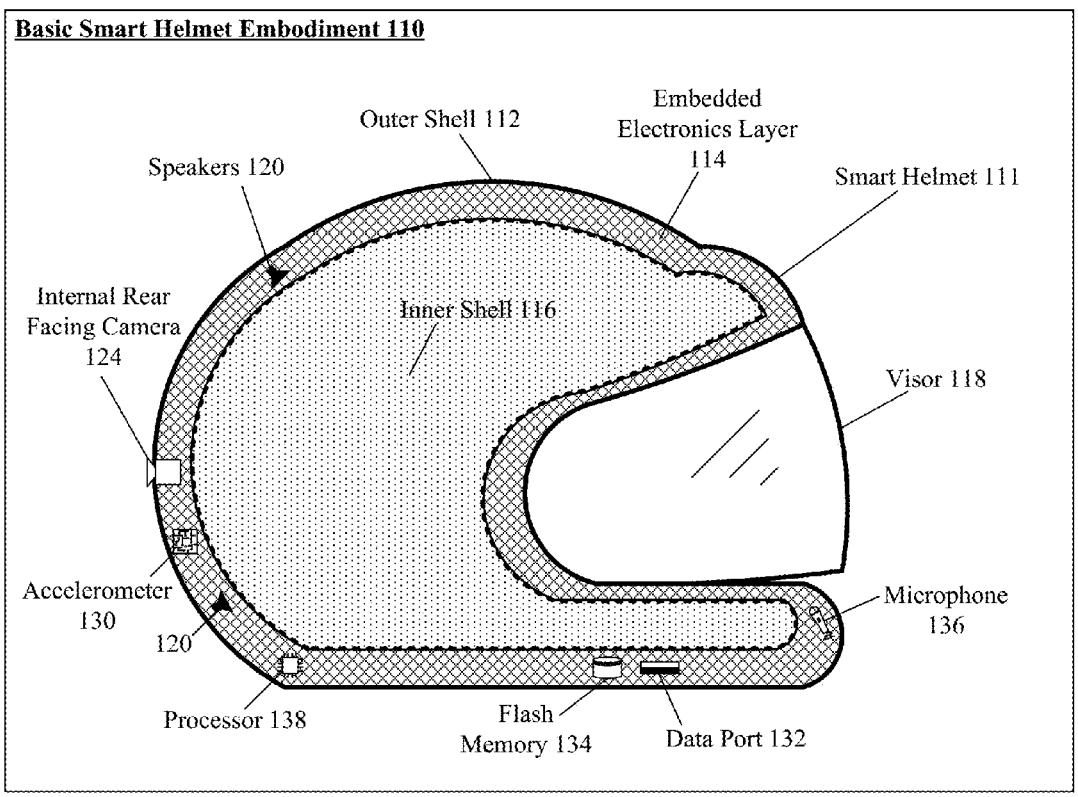
FIG. 1D is a schematic diagram illustrating an embodiment for embedding intelligent electronics within a motorcycle helmet in accordance with an embodiment of the inventive arrangements disclosed herein.

FIG. 1D is a schematic diagram illustrating an embodiment 110 for embedding intelligent electronics within a motorcycle helmet in accordance with an embodiment of the inventive arrangements disclosed herein. Embodiment 110 can be present in the context of method 200 and/or system 300. In embodiment 110, a simple smart helmet 111 can be created utilizing components 120-138. Components 120-138 can include optional components which can be omitted permitting the smart helmet functionality is retained. It should be appreciated that helmet 111 can be similar and/or dissimilar to embodiments disclosed herein.

In embodiment 110, an embedded electronics layer sandwiched between an outer shell 112 and an inner shell 116 of a motorcycle helmet can provide a medium for components 120-138 to reside. Components 120-138 can include, but is not limited to, speakers 120 (e.g., stereo speaker configuration), internal rear facing camera 124 (e.g., blind spot monitoring), accelerometer 130, data port 132 (e.g., S-Video out), flash memory 134, microphone 136, processor 138, and the like. It should be appreciated that components 120-138 can be clustered and/or can be distributed throughout the shell 112, layer 114, shell 116, and/or visor 118. Embodiment 110 can lack a heads up display (HUD) which can be replaced with a voice user interface. For example, for a wearer to interact with the smart helmet, a voice command can be spoken. In one instance, audio notifications can be presented to assist the wearer during travel. Assistance can include pre-collision notifications, emergency assistance, vehicle information presentation, navigation assistance, and the like.

In one instance, functionality including, but not limited to, audio/video processing, application management, configuration, and the like can be offloaded to proximate devices. For example, a mobile phone (e.g., IPHONE, ANDROID) can be utilized to download and/or manage images captured by camera 124.

In one instance, helmet 111 can function as a black box device. In the instance, layer 114 can include fire retardant materials, fire resistant materials, shock absorbing materials, and the like. That is, layer 114 can protect components 120-138 during an impact, fall, fire, and the like.

Figure 2:
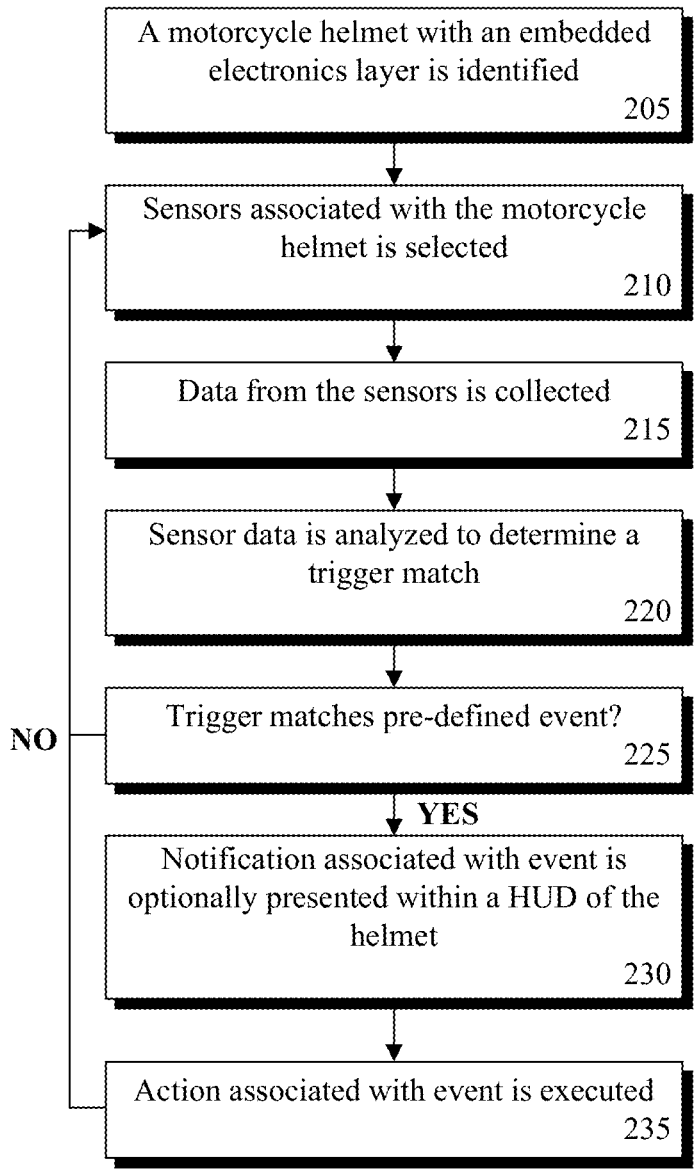
FIG. 2 is a flow chart illustrating a method for embedding intelligent electronics within a motorcycle helmet in accordance with an embodiment of the inventive arrangements disclosed herein.

FIG. 2 is a schematic diagram illustrating a method 200 for embedding intelligent electronics within a motorcycle helmet in accordance with an embodiment of the inventive arrangements disclosed herein. In method 200, a motorcycle helmet can include embedded electronic components able to assist a motorcycle rider. Method 200 can be performed in real-time or near real-time. Steps 205-235 can be performed in serial and/or in parallel.

In step 205, a motorcycle helmet with an embedded electronics layer can be identified. In step 210, sensors associated with the motorcycle helmet can be selected. Selection can be ordered, random, and the like. In step 215, data from the sensors can be collected. Collection can be performed via polling, pushing, and the like. In step 220, sensor data can be analyzed to determine a trigger match. Triggers can be manually and/or automatically established. For example, a trigger for exceeding a speed limit of a roadway can be manually established, enabling the rider to conform to traffic laws. If the trigger matches pre-defined event, the method can continue to step 230, else return to 210. In step 230, a notification associated with the event can be optionally presented within a heads up display (HUD) of the helmet. The notification can be an aural and/or visual notification. In step 235, an action associated with the event can be executed. For example, a log (e.g., date, time, location) can be stored for each time a rider exceeds the speed limit of the roadway.

Drawings presented herein are for illustrative purposes only and should not be construed to limit the invention in any regard. Method 200 can be performed during wear, enabling a smart helmet to aid a motorcycle rider while travelling.

Figure 3:
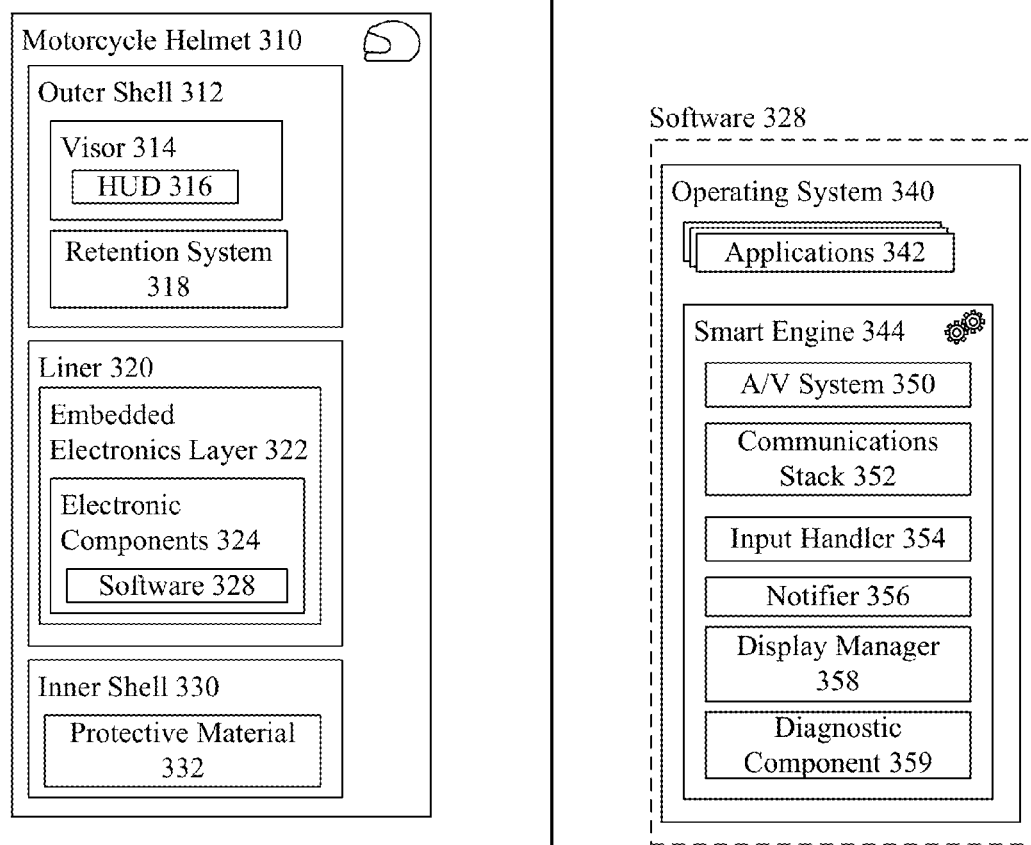
FIG. 3 is a schematic diagram illustrating a system for embedding intelligent electronics within a motorcycle helmet in accordance with an embodiment of the inventive arrangements disclosed herein.

FIG. 3 is a schematic diagram illustrating a system 300 for embedding intelligent electronics within a motorcycle helmet in accordance with an embodiment of the inventive arrangements disclosed herein. System 300 can be present in the context of scenarios of FIG. 1A, 1B, 1C and/or method 200. System 300 can include a motorcycle helmet 310 arrangement and a software 328 arrangement. In system 300, a motorcycle helmet 310 can include an outer shell 312, liner 320, and inner shell 330. Liner 320 can include electronic components 324 enabling the execution of software 328.

Outer shell 312 can be a rigid outer frame able to house liner 320 and inner shell 330. Outer shell 312 can include, but is not limited to visor 314, retention system 318, and the like. Visor 314 can include HUD 316 which can be removed (e.g., detachable), enabled/disabled, and the like. Retention system 318 can include a traditional and/or proprietary retention system. For example, retention system 318 can be an adjustable chin strap. In one instance, shell 312 can be constructed from a microporous material, nanoporous material, and the like. For example, micropores within shell 312 can be utilized to vent heat from components 324 while protecting components 324.

Liner 320 can be a rigid, semi-rigid, and/or compressible liner able to house embedded electronics layer 322. Layer 322 can include, but is not limited to, electronic components 324, a framework (e.g., positioning, stabilizing) associated with components 324, and the like. Components 324 can include executable software 328. In one instance, layer 322 can be removable permitting components 324 to be diagnosed, repaired, replaced, upgraded, and the like.

Inner shell 330 can be a structure able to house protective material 332. In one instance, shell 330 can be an expanded polystyrene layer, a polyurethane layer, and the like. In one embodiment, piezoelectric speakers and/or microphones can be embedded into the layer to permit sound to be easily transmitted to and received from a wearer. It should be appreciated that shell 330 can include optional elements such as a comfort liner, sizing adjustment padding, and the like.

Software 328 can be a set of programs, procedures, algorithms and related documentation concerned with the operation of a data processing system. Software 328 can include operating system 340. System 340 can execute applications 342, smart engine 344, and the like. Operating system 340 can include traditional and/or proprietary operating systems. For example, system 340 can be a QNX real-time operating system. Applications 342 can include system applications, user applications, and the like.

Smart engine 344 can be a hardware/software element for enabling an intelligent motorcycle helmet. Engine 344 can include, but is not limited to, an A/V system 350, a communications stack 352, an input handler 354, a notifier 356, a display manager 358, a diagnostic component 359, and the like. Engine 344 can include third party software, user established software, and the like.

A/V system 350 can be a hardware/software component for managing audio, video and/or images within system 340. Management can include, but is not limited to, recording audio/video, editing audio/video, deleting audio/video, recording an image, editing an image, deleting an image, and the like. System 350 can be communicatively linked to components 352-359 enabling cohesive functionality.

Communication stack 352 can be a hardware/software stack permitting communication between components 350, 354-359, proximate computing devices, remote computing devices, and the like. Stack 352 can include traditional and/or proprietary communication protocols. Protocols can include, but is not limited to Hypertext Transport Protocol (HTTP), Transport Control Protocol (TCP), Internet Protocol (IP), Session Initiated Protocol (SIP), Real-time Transport Protocol (RTP), Secure Sockets Layer (SSL), and the like.

Input handler 354 can be a hardware/software component able to receive and/or communicate input from a rider and/or component. Handler 354 functionality can include, user input processing, sensor input processing, and the like. Handler 354 can include events, triggers, and the like enabling intelligent behavior responsive to a variety of inputs. For example, a trigger can be established for notifying a rider (e.g., generating a notification) when a gear change is recommended by setting a revolutions per minute value (e.g., 3000) within the trigger. Handler 354 can be communicatively linked to components 352-359 enabling cohesive functionality.

Notifier 356 can be a hardware/software element for presenting and/or managing notifications. Notifier 356 can manage and/or produce audio alerts, visual alerts, tactile alerts (e.g., vibration alert), and the like. Notifier 356 can be an event driven component able to respond to trigger matches. For example, notifier 356 can generate one or more alerts when a rider approaches too close to a vehicle. Notifier 356 can be communicatively linked to components 352-359 enabling cohesive functionality.

Display manager 358 can be a hardware/software component for controlling a heads up display (HUD), an electronic display (e.g., proximate device), and the like. Manager 358 can be utilized to adjust HUD style (e.g., color, size, and theme), HUD brightness, HUD activation/deactivation, HUD interactivity (e.g., sensitivity), sensor display information, and the like. Manager 358 can be communicatively linked to components 352-359 enabling cohesive functionality.

Diagnostic component 359 can be a hardware/software element for performing diagnostic functionality on components within layer 322, software 328, and the like. In one instance, diagnostic component 359 can be an independent element able to identify components, repair components, determine malfunctioning components, and the like. In one embodiment, component 359 can include a redundant system including secondary components of component type 350-358.

Drawings presented herein are for illustrative purposes only and should not be construed to limit the invention in any regard. It should be appreciated that the disclosure is not limited to electronic components 324 embedded within layer 332, but can be distributed throughout the helmet as necessary.

The flowchart and block diagrams in the FIGS. 1A-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An intelligent motorcycle helmet comprising:
a motorcycle helmet comprising a plurality of internally mounted sensors within the motorcycle helmet, wherein the plurality of sensors is positioned within an embedded electronics layer, wherein the layer comprises logic processing components, wherein the layer is sandwiched between an outer shell of the helmet and an inner shell of the helmet;
a compressible liner positioned between the outer shell and the inner shell, wherein the compressible liner houses the embedded electronics layer, wherein the embedded electronics layer of the compressible liner is removable permitting components embedded in the electronics layer to be diagnosed, repaired, replaced, and upgraded;
a non-transitory software program executing within the logic processing components receiving input from the plurality of sensors in real-time; and
the non-transitory software program automatically executing a programmatic action responsive to the receiving.

2. The helmet of claim 1, wherein at least one of the plurality of sensors is a forward oriented camera and backward oriented camera, wherein the forward oriented camera is configured to capture a scene in front of a wearer, wherein the backward oriented camera is configured to capture a scene behind the wearer.

3. The helmet of claim 1, further comprising
a software platform configured to manage a diagnostics functionality associated with the helmet.

4. The helmet of claim 1, further comprising:
a data store embedded within the layer able to persist at least one of a video media, an audio media, and an image media, wherein the layer comprises of at least one of a internally mounted Global Positioning System transceiver, a three-axis accelerometer, a volatile storage element, a non-volatile storage element, a near field communication transceiver, a microphone, and a data connector.

5. The helmet of claim 1, wherein the outer shell is a rigid material, wherein the inner shell is an expanded polystyrene layer or a polyurethane layer.

6. The helmet of claim 1, further comprising:
a heads up display (HUD) within the visor of the helmet, wherein the HUD is configured to present at least one of a plurality of camera streams, a collision notification, a media stream, an instrumentation information, a navigation map, and an accelerometer reading; and,
a sensor within the layer positioned to detect an object within a blind spot of the wearer, wherein the blind spot is a field of view which exceeds the maximum field of view at which the wearer is able to see and identify prominent proximate objects.

7. The helmet of claim 1, further comprising:
a removable memory component able to persist media associated with at least one of a wearer, a motorcycle, and a proximate computing device.

8. The helmet of claim 1, further comprising:
a wireless fidelity (WiFi) component able to permit communication between the electronic components within the layer and external computing devices.

9. The helmet of claim 1, further comprising:
a data port configured to permit communication between the electronic components within the layer and external computing devices.

10. A method for a motorcycle heads up display comprising:
identifying at least one internally mounted sensor within a motorcycle helmet, wherein the sensor is positioned within an embedded electronics layer, wherein the layer comprises of a plurality of electronic components, wherein the layer is sandwiched between an outer shell of the helmet and an inner shell of the helmet;
receiving at least one data stream from the sensor in real-time;

processing the data stream into a human readable data format to determine that a gear change is recommended for a motorcycle being ridden by a rider who is wearing the motorcycle helmet;

presenting the data format within a display communicatively linked to the helmet to notify the rider of the recommended gear change; and analyzing another data stream from the sensor of the embedded electronics layer to detect a collision event has occurred, wherein the collision event is traffic collision.

11. The method of claim 10, wherein the display is a heads up display (HUD), wherein the HUD is a portion of a visor of the helmet.

12. The method of claim 10, further comprising:

automatically notifying an emergency contact responsive to the collision event.

13. The method of claim 10, further comprising:

analyzing another data stream from a sensor of the embedded electronics layer to forecast a collision event with an object.

14. The method of claim 13, presenting a warning notification within the display of the helmet, responsive to the forecast.

15. The method of claim 10, further comprising:

automatically communicating at least one of a portion of the data stream associated with the helmet with a remote entity.

16. The method of claim 10, further comprising:

automatically communicating an inertial navigational system data associated with the helmet with a remote entity.

17. A computer program product comprising a non-transitory computer readable storage medium having computer usable program code embodied therewith, the computer usable program code comprising:

computer usable program code stored in a storage medium, if said computer usable program code is executed by a processor it is operable to manage a plurality of internally mounted sensors within a motorcycle helmet, wherein the plurality of sensors is positioned within an embedded electronics layer, wherein the layer comprises of a plurality of electronic components, wherein the layer is sandwiched between an outer shell of the helmet and an inner shell of the helmet, wherein the computer usable program code includes diagnostic code for performing diagnostics of components of the embedded electronics layer, wherein computer usable code executed by the processor is able to continue to provide functionality dependent on a physical component of the embedded electronics layer even when that physical component is diagnosed by the diagnostic code as a malfunctioning component by using a redundant component within the embedded electronics layer to the malfunctioning component; and a smart engine of the embedded electronics layer, configured to handle at least one of a communication, an input, a heads up display presentation, and a diagnostics functionality associated with the motorcycle helmet.

* * * * *